US012589735B2

(12) United States Patent (10) Patent No.: US 12,589,735 B2
Oka et al. (45) Date of Patent: Mar. 31, 2026

(54) DRIVING ASSISTANCE DEVICE, VEHICLE CONTROL SYSTEM, AND DRIVING ASSISTANCE METHOD FOR FRONTAL COLLISION DETECTION AND AVOIDANCE

(71) Applicant: HONDA MOTOR CO., LTD., Tokyo (JP)

(72) Inventors: Keisuke Oka, Wako (JP); Shinya Maruo, Wako (JP); Shunya Ishikawa, Wako (JP); Yohei Kitahara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 243 days.

(21) Appl. No.: 18/113,632

(22) Filed: Feb. 24, 2023

(65) Prior Publication Data

US 2023/0294678 A1 Sep. 21, 2023

(30) Foreign Application Priority Data

Mar. 18, 2022 (JP) ................................. 2022-044396

(51) Int. Cl.
*B60W 30/09* (2012.01)
*B60W 10/04* (2006.01)
(Continued)

(52) U.S. Cl.
CPC ............ *B60W 30/09* (2013.01); *B60W 10/04* (2013.01); *B60W 10/18* (2013.01); *B60W 10/20* (2013.01);
(Continued)

(58) Field of Classification Search
CPC ...... B60W 30/09; B60W 10/04; B60W 10/18; B60W 10/20; B60W 50/16;
(Continued)

(56) References Cited

U.S. PATENT DOCUMENTS 8,909,428 B1 * 12/2014 Lombrozo ............... B62D 1/04
701/41
2009/0150034 A1 6/2009 Ezoe et al.
(Continued)

FOREIGN PATENT DOCUMENTS

JP 2007-210591 8/2007
JP 2013-126823 6/2013
(Continued)

OTHER PUBLICATIONS

Japanese Office Action for Japanese Patent Application No. 2022-044396 mailed Sep. 5, 2023.

*Primary Examiner* — Scott A Browne
*Assistant Examiner* — Izcalli Rios-Aguirre
(74) *Attorney, Agent, or Firm* — Amin, Turocy & Watson, LLP

(57) ABSTRACT

A driving assistance device mounted in a vehicle operates together with an automated driving control device for automatically controlling steering, acceleration, and deceleration of the vehicle in either of a first state in which a driver is not gripping a steering operation element and a second state in which the driver is gripping the steering operation element, the driving assistance device including a storage medium storing computer-readable instructions and at least one processor connected to the storage medium. The at least one processor makes an operation start condition of a second preliminary operation loose when the automated driving control device is operating in the second state as compared with when the automated driving control device is not operating.

8 Claims, 10 Drawing Sheets

(51) Int. Cl.

| | |
|---|---|
| *B60W 10/18* | (2012.01) |
| *B60W 10/20* | (2006.01) |
| *B60W 50/16* | (2020.01) |
| *B60W 50/14* | (2020.01) |

(52) U.S. Cl.
CPC ....... *B60W 50/16* (2013.01); *B60W 2050/143* (2013.01); *B60W 2050/146* (2013.01); *B60W 2540/18* (2013.01); *B60W 2554/802* (2020.02); *B60W 2554/804* (2020.02); *B60W 2710/18* (2013.01); *B60W 2710/20* (2013.01); *B60W 2720/106* (2013.01)

(58) Field of Classification Search
CPC ..... B60W 2050/143; B60W 2050/146; B60W 2540/18; B60W 2554/802; B60W 2554/804; B60W 2710/18; B60W 2710/20; B60W 2720/106
See application file for complete search history.

(56) References Cited

U.S. PATENT DOCUMENTS

2010/0030474 A1* 2/2010 Sawada ............... B62D 15/029
701/301

| | | | | |
|---|---|---|---|---|
| 2012/0101701 | A1* | 4/2012 | Moshchuk | ............ B60W 30/09 701/70 |
| 2014/0324286 | A1* | 10/2014 | Tsuchida | .............. B60W 30/09 701/36 |
| 2018/0162388 | A1* | 6/2018 | You | ........................ G06V 20/58 |
| 2018/0257644 | A1* | 9/2018 | Morotomi | ........... G05D 1/0246 |
| 2019/0061745 | A1 | 2/2019 | Hatano | |
| 2019/0092343 | A1* | 3/2019 | Hoshikawa | ........... B60W 30/08 |
| 2019/0100197 | A1* | 4/2019 | Saiki | ..................... B60Q 9/008 |
| 2019/0126917 | A1 | 5/2019 | You | |
| 2019/0143968 | A1* | 5/2019 | Song | ..................... B60W 10/18 |
| 2020/0108771 | A1* | 4/2020 | Kang | ................... B60W 30/00 |
| 2021/0080949 | A1* | 3/2021 | Takeda | ..................... B62D 1/06 |
| 2021/0402996 | A1* | 12/2021 | Wang | ................. B60W 40/105 |

FOREIGN PATENT DOCUMENTS

| | | | | |
|---|---|---|---|---|
| JP | 2020-050010 | | 4/2020 | |
| JP | 2020-097346 | | 6/2020 | |
| WO | 2017/154070 | | 9/2017 | |
| WO | WO-2017179505 | A1 * | 10/2017 | ............ B60R 21/00 |
| WO | WO-2021059670 | A1 * | 4/2021 | ............... B60T 7/12 |

* cited by examiner

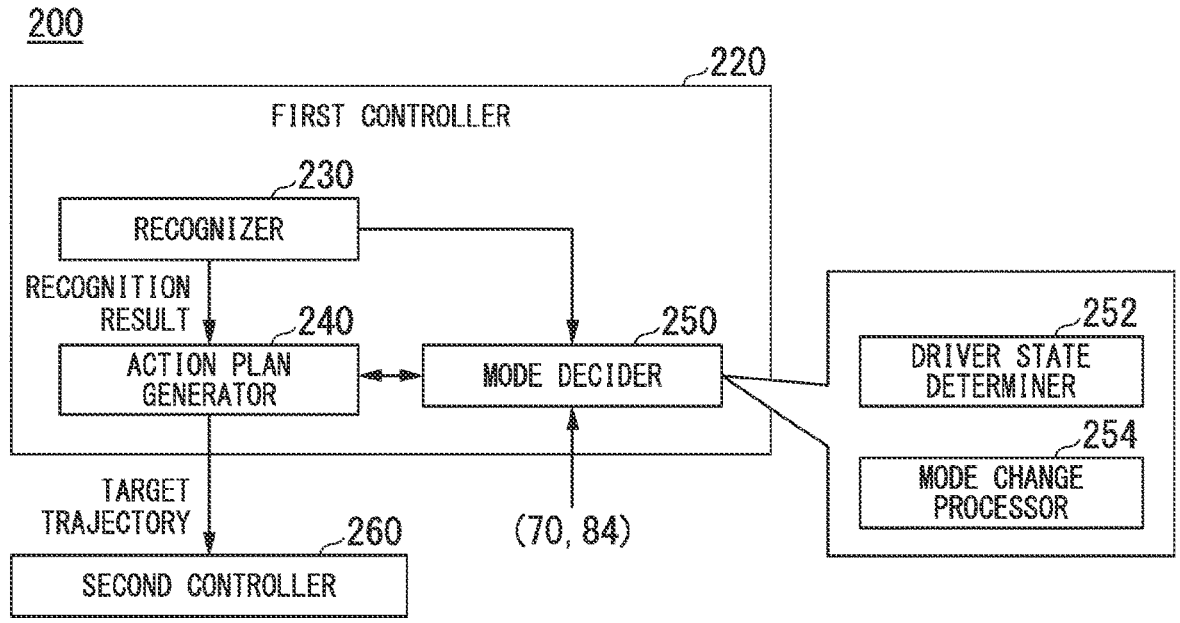

FIG. 8

| DRIVING MODE | CONTROL STATE | TASK | |
|---|---|---|---|
| MODE A | AUTOMATED DRIVING | FORWARD MONITORING: UNNECESSARY STEERING GRIP: UNNECESSARY | TASK: LIGHT |
| MODE B | DRIVING ASSISTANCE | FORWARD MONITORING: NECESSARY STEERING GRIP: UNNECESSARY | |
| MODE C | DRIVING ASSISTANCE | FORWARD MONITORING: NECESSARY STEERING GRIP: NECESSARY | |
| MODE D | DRIVING ASSISTANCE | FORWARD MONITORING: NECESSARY AT LEAST CERTAIN DEGREE OF DRIVING OPERATION IS NECESSARY | |
| MODE E | MANUAL DRIVING | FORWARD MONITORING: NECESSARY DRIVING OPERATION IS NECESSARY TOGETHER WITH STEERING AND ACCELERATION/DECELERATION | TASK: HEAVY |

DRIVING ASSISTANCE DEVICE, VEHICLE CONTROL SYSTEM, AND DRIVING ASSISTANCE METHOD FOR FRONTAL COLLISION DETECTION AND AVOIDANCE

CROSS-REFERENCE TO RELATED APPLICATION

Priority is claimed on Japanese Patent Application No. 2022-044396, filed Mar. 18, 2022, the content of which is incorporated herein by reference.

BACKGROUND

Field of the Invention

The present invention relates to a driving assistance device, a vehicle control system, and a driving assistance method.

Description of Related Art

Recently, an invention of a vehicle control device for performing automated deceleration control and automated steering control has been disclosed (Japanese Unexamined Patent Application, First Publication No. 2020-50010).

SUMMARY

In a vehicle capable of performing automated steering control in addition to automated deceleration control, a probability that any sudden change in a surrounding environment of a vehicle can be coped with quickly becomes high and a degree of control margin becomes relatively high. On the other hand, because automated steering control becomes difficult if there is no avoidance space on a lateral side of a target object, a degree of control margin is no different from that of a vehicle that performs only automated deceleration control. Thus, it is preferable to perform an appropriate preliminary operation. On the other hand, although automated driving technology has been put into practical use in recent years, it may be difficult to perform an appropriate preliminary operation in relation to a state of automated driving in the conventional technology.

The present invention has been made in consideration of such circumstances and an objective of the present invention is to provide a driving assistance device, a vehicle control system, and a driving assistance method capable of performing an appropriate preliminary operation corresponding to a state of automated driving.

A driving assistance device, a vehicle control system, and a driving assistance method adopt the following configurations.

(1): According to an aspect of the present invention, there is provided a driving assistance device mounted in a vehicle together with an automated driving control device for automatically controlling steering, acceleration, and deceleration of the vehicle in either of a first state in which a driver is not gripping a steering operation element and a second state in which the driver is gripping the steering operation element, the driving assistance device including: a storage medium storing computer-readable instructions; and at least one processor connected to the storage medium, the at least one processor executing the computer-readable instructions to: recognize a lane where the vehicle is located; refer to an output of a detection device for detecting that an object is located in front of the vehicle; execute one or both of instructing a brake device of the vehicle to stop the vehicle and instructing a steering device of the vehicle to avoid a collision with the object in steering, when an indicator value that decreases as the vehicle approaches the object is less than a first threshold; execute a first preliminary operation when the indicator value is less than a second threshold; execute a second preliminary operation when the indicator value is less than a third threshold and it is determined, at a time point when the indicator value is less than the third threshold, that there is no travel path along which the vehicle is able to travel on both lateral sides of the object after the vehicle avoids the collision with the object in the steering; and make an operation start condition of the second preliminary operation loose when the automated driving control device is operating in the second state as compared with when the automated driving control device is not operating, wherein the first threshold is less than the second threshold and the second threshold is less than the third threshold.

(2): In the above-described aspect (1), the at least one processor causes an output device to output information for prompting the driver to grip the steering operation element in synchronization with the second preliminary operation when the automated driving control device is operating in the first state.

(3): In the above-described aspect (2), after the output device is allowed to output the information, the at least one processor advances an operation timing of the second preliminary operation when the driver is not gripping the steering operation element as compared with when the driver is gripping the steering operation element.

(4): In the above-described aspect (1), the at least one processor makes the operation start condition of the first preliminary operation loose when the automated driving control device is operating in the second state as compared with when the automated driving control device is not operating.

(5): In the above-described aspect (1), the second preliminary operation is an operation that is started at an earlier timing than the first preliminary operation.

(6): In the above-described aspect (1), at least one of the first preliminary operation and the second preliminary operation is an operation of instructing the brake device to output a braking force less than a braking force that the at least one processor instructs the brake device to output when an indicator value obtained by dividing a distance between the object and the vehicle by a relative speed is less than the first threshold.

(7): In the above-described aspect (6), both the first preliminary operation and the second preliminary operation are an operation of instructing the brake device to output a braking force less than a braking force that the at least one processor instructs the brake device to output when an indicator value obtained by dividing a distance between the object and the vehicle by a relative speed is less than the first threshold, and a braking force initially output in the second preliminary operation is less than a braking force initially output in the first preliminary operation.

(8): In the above-described aspect (1), at least one of the first preliminary operation and the second preliminary operation is an operation of instructing an output device to perform a display process, a sound output process, or a vibration output process as an alert.

(9): According to another aspect of the present invention, there is provided a vehicle control system including: the driving assistance device according to the above-described aspect (1); and the automated driving control device.

(10): According to another aspect of the present invention, there is provided a driving assistance method executed using a driving assistance device mounted in a vehicle together with an automated driving control device for automatically controlling steering, acceleration, and deceleration of the vehicle in either of a first state in which a driver is not gripping a steering operation element and a second state in which the driver is gripping the steering operation element, the driving assistance method including: recognizing a lane where the vehicle is located; referring to an output of a detection device for detecting that an object is located in front of the vehicle; executing one or both of instructing a brake device of the vehicle to stop the vehicle and instructing a steering device of the vehicle to avoid a collision with the object in steering, when an indicator value that decreases as the vehicle approaches the object is less than a first threshold; executing a first preliminary operation when the indicator value is less than a second threshold; executing a second preliminary operation when the indicator value is less than a third threshold and it is determined, at a time point when the indicator value is less than the third threshold, that there is no travel path along which the vehicle is able to travel on both lateral sides of the object after the vehicle avoids the collision with the object in the steering; and making an operation start condition of the second preliminary operation loose when the automated driving control device is operating in the second state as compared with when the automated driving control device is not operating, wherein the first threshold is less than the second threshold and the second threshold is less than the third threshold.

According to the aspects (1) to (10), it is possible to perform an appropriate preliminary operation corresponding to a state of automated driving.

BRIEF DESCRIPTION OF THE DRAWINGS

FIG. 3 is a diagram showing an overview of a function of the driving assistance device.

FIG. 4 is a diagram showing an example of an operation scene of a steering-based avoidance controller.

FIG. 5 is a diagram for describing a preliminary operation.

FIG. 7 is a configuration diagram of an automated driving control device.

FIG. 8 is a diagram showing an example of corresponding relationships between driving modes, control states of a host vehicle, and tasks.

DESCRIPTION OF EMBODIMENTS

Hereinafter, embodiments of a driving assistance device, a vehicle control system, and a driving assistance method according to the present invention will be described with reference to the drawings.

[Overall Configuration]

Figure 1:
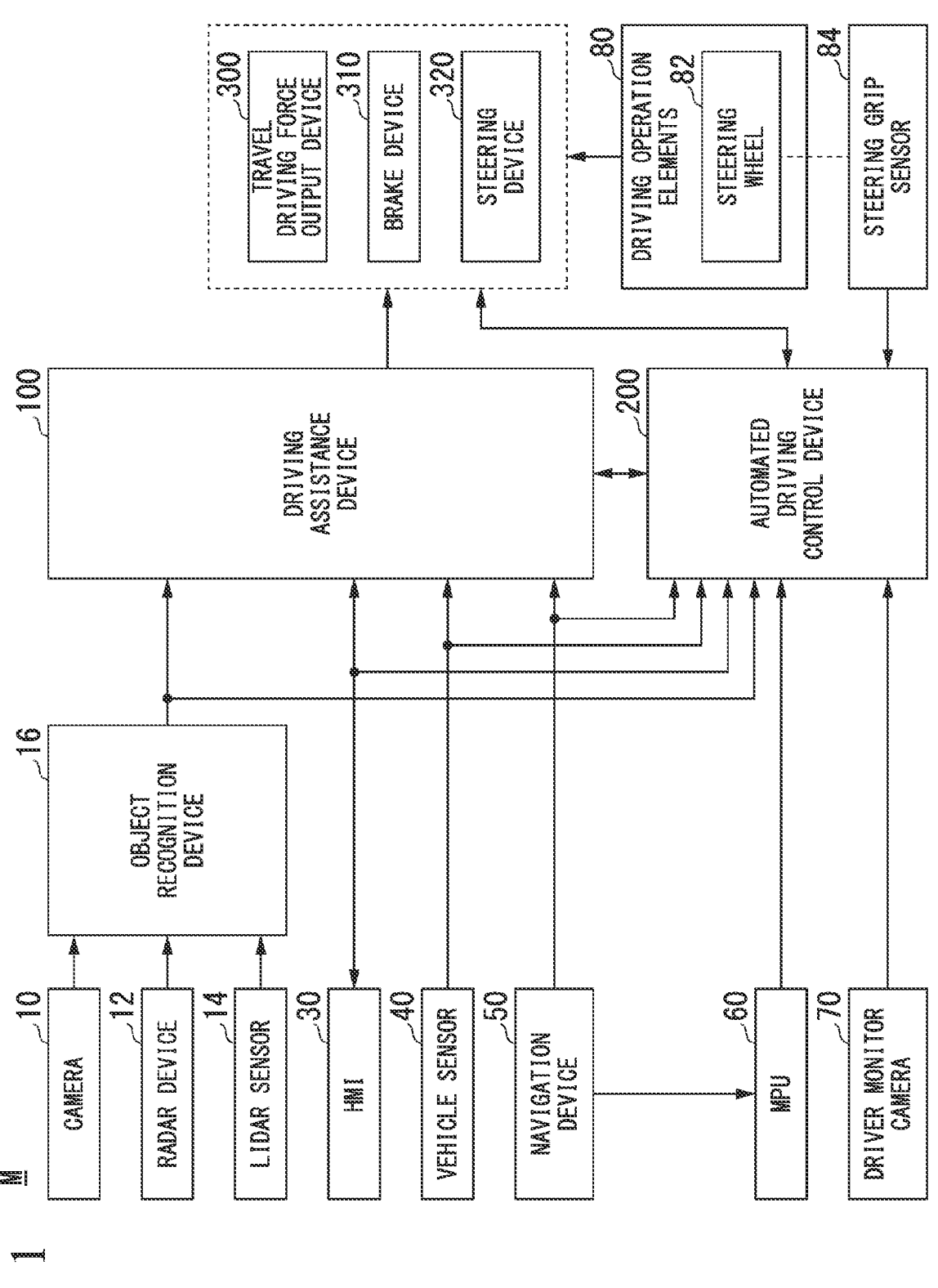
FIG. 1 is a configuration diagram of a vehicle in which a driving assistance device according to an embodiment is mounted.

FIG. 1 is a configuration diagram of a vehicle M in which a driving assistance device 100 of an embodiment is mounted. The vehicle M is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power that is supplied when a secondary battery or a fuel cell is discharged.

For example, the vehicle M includes a camera 10, a radar device 12, a light detection and ranging (LIDAR) sensor 14, an object recognition device 16, a human machine interface (HMI) 30, a vehicle sensor 40, a navigation device 50, a map positioning unit (MPU) 60, a driver monitor camera 70, driving operation elements 80, a driving assistance device 100, an automated driving control device 200, a travel driving force output device 300, a brake device 310, and a steering device 320. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added.

For example, the camera 10 is a digital camera using a solid-state imaging element such as a charge-coupled device (CCD) or a complementary metal oxide semiconductor (CMOS). The camera 10 is attached to any location on the vehicle (hereinafter, the vehicle M) in which the vehicle system 1 is mounted. When the view in front of the vehicle M is imaged, the camera 10 is attached to an upper part of a front windshield, a rear surface of a rearview mirror, or the like. For example, the camera 10 periodically and iteratively images the surroundings of the vehicle M. The camera 10 may be a stereo camera.

The radar device 12 radiates radio waves such as millimeter waves around the vehicle M and detects at least a position (a distance to and a direction) of an object by detecting radio waves (reflected waves) reflected by the object. The radar device 12 is attached to any location on the vehicle M. The radar device 12 may detect a position and speed of the object in a frequency modulated continuous wave (FM-CW) scheme.

The LIDAR sensor 14 radiates light (or electromagnetic waves of a wavelength close to an optical wavelength) to the vicinity of the vehicle M and measures scattered light. The LIDAR sensor 14 detects a distance to an object on the basis of a time period from light emission to light reception. The radiated light is, for example, pulsed laser light. The LIDAR sensor 14 is attached to any location on the vehicle M.

The object recognition device 16 performs a sensor fusion process for detection results from some or all of the camera 10, the radar device 12, and the LIDAR sensor 14 to recognize a position, a type, a speed, and the like of an object. The object recognition device 16 outputs recognition results to the driving assistance device 100. The object recognition device 16 may output detection results of the camera 10, the radar device 12, and the LIDAR sensor 14 to the driving assistance device 100 as they are. The object recognition device 16 may be omitted from the vehicle system 1. Some or all of the camera 10, the radar device 12, the LIDAR sensor 14, and the object recognition device 16 are an example of a "detection device."

The HMI 30 provides an occupant of the vehicle M with various types of information and receives an input operation from the occupant. The HMI 30 includes various types of display devices, a speaker, a buzzer, a vibration generation device (a vibrator), a touch panel, a switch, a key, and the like.

The vehicle sensor 40 includes a vehicle speed sensor configured to detect the speed of the vehicle M, an acceleration sensor configured to detect acceleration, a yaw rate sensor configured to detect an angular speed around a vertical axis, a direction sensor configured to detect a direction of the vehicle M, and the like.

The navigation device 50 has, for example, a global navigation satellite system (GNSS) receiver, a guidance controller, a storage storing map information, and the like. The GNSS receiver identifies a position of the vehicle M on the basis of signals received from GNSS satellites. A position of the vehicle M may be identified or corrected by an inertial navigation system (INS) using an output of the vehicle sensor 40. For example, the guidance controller decides on a route from the position of the vehicle M identified by the GNSS receiver (or any input position) to a destination input by the occupant with reference to the map information and causes the HMI 30 to output guidance information so that the vehicle M travels along a path. The map information is, for example, information in which a road shape is expressed by a link indicating a road and nodes connected by the link. The map information may include curvature of a road, point of interest (POI) information, and the like. The navigation device 50 may transmit a current position and a destination of the vehicle M to a navigation server via the communication device and acquire a route from the navigation server.

For example, the MPU 60 includes a recommended lane decider and stores second map information in a storage device such as an HDD or a flash memory. The recommended lane decider divides the route on the map provided from the navigation device 50 into a plurality of blocks (for example, divides the route every 100 [m] in a traveling direction of the vehicle), and decides on a recommended lane for each block with reference to the second map information. The recommended lane decider decides in what lane numbered from the left the vehicle will travel. The recommended lane decider 61 decides on the recommended lane so that the host vehicle M can travel along a reasonable route for traveling to a branching destination when there is a branch point in the route on the map. The second map information is map information having higher accuracy than the map information of the navigation device 50.

The driver monitor camera 70 is, for example, a digital camera that uses a solid-state image sensor such as a CCD or a CMOS. The driver monitor camera 70 is attached to any location on the host vehicle M with respect to a position and a direction where the head of the occupant (hereinafter, the driver) sitting in the driver's seat of the host vehicle M can be imaged from the front (in a direction in which his/her face is imaged). For example, the driver monitor camera 70 is attached to an upper part of a display device provided on the central portion of the instrument panel of the host vehicle M.

For example, the driving operation elements 80 include an accelerator pedal, a brake pedal, a shift lever, and other operation elements in addition to a steering wheel 82. A sensor configured to detect an amount of operation or the presence or absence of an operation is attached to the driving operation element 80 and a detection result of the sensor is output to the automated driving control device 200 or some or all of the travel driving force output device 300, the brake device 310, and the steering device 320. The steering wheel 82 is an example of a "steering operation element." The steering operation element does not necessarily have to be annular and may be in the form of a variant steering wheel, a joystick, a button, or the like. A steering grip sensor 84 is attached to the steering wheel 82. The steering grip sensor 84 is implemented by a capacitance sensor or the like and outputs a signal for detecting whether or not the driver is gripping the steering wheel 82 (indicating that the driver is in contact with the steering wheel 82 in a state in which a force is applied) to the automated driving control device 200.

The travel driving force output device 300 outputs a travel driving force (torque) for enabling the vehicle to travel to driving wheels. For example, the travel driving force output device 300 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the driving assistance device 100, information input from the automated driving control device 200, or information input from the driving operation element 80.

For example, the brake device 310 includes a brake caliper, a cylinder configured to transfer hydraulic pressure to the brake caliper, an electric motor configured to generate hydraulic pressure in the cylinder, and an ECU. The ECU controls the electric motor in accordance with the information input from the driving assistance device 100, the information input from the automated driving control device 200, or the information input from the driving operation element 80 so that brake torque according to a braking operation is output to each wheel. The brake device 310 may include a mechanism configured to transfer the hydraulic pressure generated according to an operation on the brake pedal included in the driving operation elements 80 to the cylinder via a master cylinder as a backup. The brake device 310 is not limited to the above-described configuration and may be an electronically controlled hydraulic brake device configured to control an actuator in accordance with information input from the driving assistance device 100 and the like and transfer the hydraulic pressure of the master cylinder to the cylinder.

For example, the steering device 320 includes a steering ECU and an electric motor. For example, the electric motor changes a direction of steerable wheels by applying a force to a rack and pinion mechanism. The steering ECU drives the electric motor in accordance with the information input from the driving assistance device 100, the information input from the automated driving control device 200, or the information input from the driving operation element 80 to change the direction of the steerable wheels.

[Driving Assistance Device]

Figure 2:
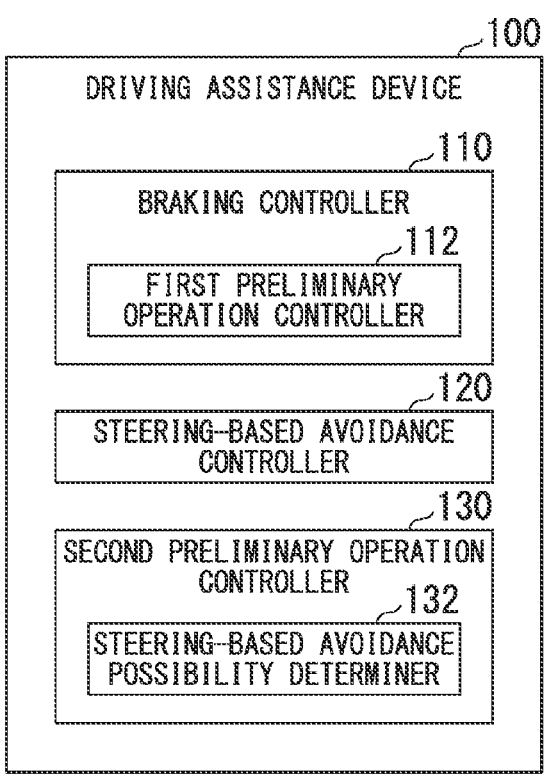
FIG. 2 is a configuration diagram of the driving assistance device.

FIG. 2 is a configuration diagram of the driving assistance device 100. The driving assistance device 100 includes, for example, a braking controller 110, a steering-based avoidance controller 120, and a second preliminary operation controller 130. The braking controller 110 includes a first preliminary operation controller 112 and the second preliminary operation controller 130 includes a steering-based avoidance possibility determiner 132. Each of these functional components is implemented, for example, by at least one processor such as a central processing unit (CPU) executing a program (software). Also, some or all of the above components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as a hard disk drive (HDD) or a flash memory of the driving assistance device 100 or may be stored in a removable storage medium such as a digital video disc (DVD) or a compact disc (CD)-read-only memory (ROM) and installed in the HDD or the flash memory of the driving assistance device 100 when the storage medium (the non-transitory storage medium) is mounted in a drive device.

Setting is performed inside of the travel driving force output device 300, the brake device 310, and the steering device 320 so that instructions from the driving assistance device 100 to the travel driving force output device 300, the brake device 310, and the steering device 320 are issued with preference over a detection result from the driving operation element 80. Also, in relation to braking, if a braking force based on an operation amount of the brake pedal is larger than that in the instruction from the driving assistance device 100, setting may be performed so that the braking operation is preferentially executed. Also, as a mechanism for preferentially issuing an instruction from the driving assistance device 100, the communication priority in the in-vehicle LAN may be used.

The driving assistance device 100 changes the functions to be described below in accordance with an operation state of the automated driving control device 200. This will be described after the description of the automated driving control device 200.

Figure 3:
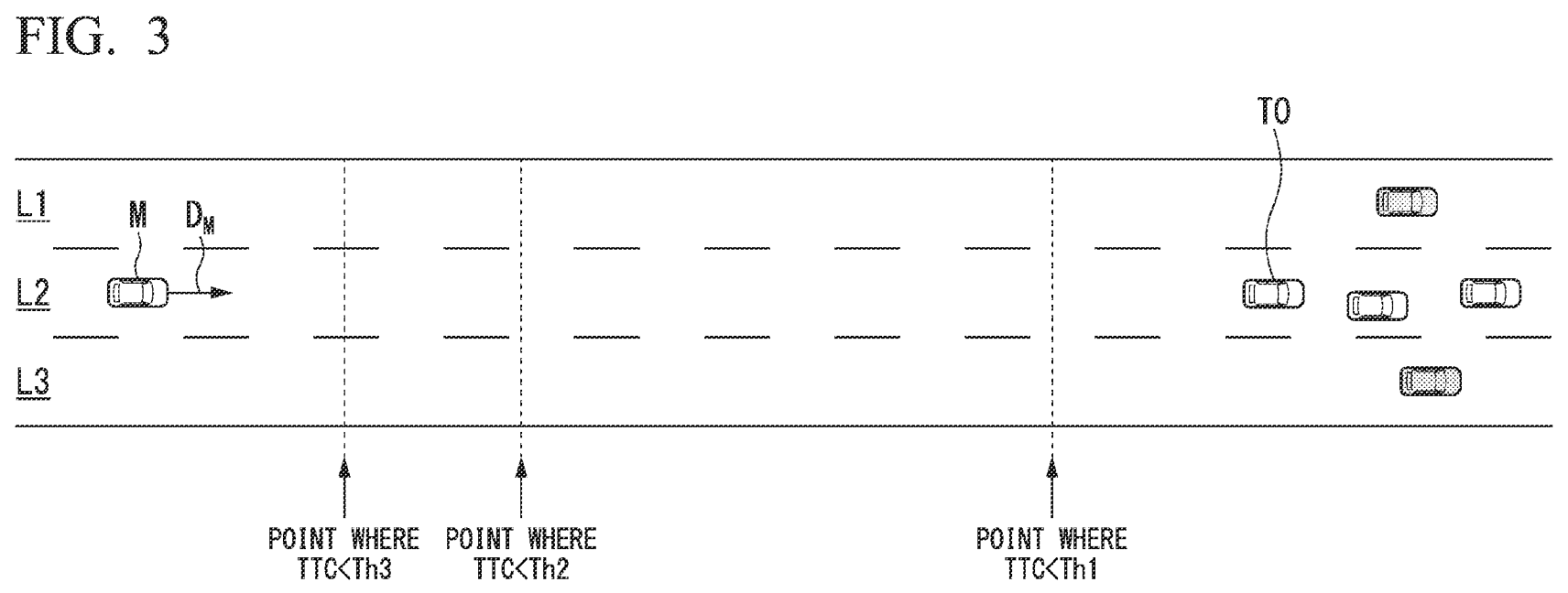

FIG. 3 is a diagram showing an overview of a function of the driving assistance device 100. Hereinafter, each part of the driving assistance device 100 will be described with reference to FIG. 2 and FIG. 3. In FIG. 3, the vehicle M is traveling on a three-lane road and is in a lane L2 in the center thereof. $D_M$ denotes a traveling direction of the vehicle M.

The braking controller 110 instructs the brake device 310 and/or the travel driving force output device 300 to decelerate and stop the vehicle M when a degree of proximity between a target object TO among objects and the vehicle M satisfies a first condition with reference to an output of the detection device (described above) that detects that an object is located in front of the vehicle M. The target object TO is an object located on the same travel path as the vehicle M and on the traveling direction side of the vehicle M and is an object with which the vehicle M should avoid a collision, rather than objects that the vehicle M can pass over such as manholes. The braking controller 110 extracts such an object and sets the extracted object as the target object TO. In the example of FIG. 2, another vehicle at the rear end of the conventional example is set as the target object TO. The travel path is, for example, a lane, but may be a virtual lane virtually set by the vehicle M on a road surface on which there is no road marking. The same is also true for the following description.

The "degree of proximity" is represented by various types of indicator values that indicate the degree of proximity between objects. For example, the "degree of proximity" is time to collision (TTC), which is an indicator value obtained by dividing a distance by a relative speed (positive in a direction in which objects approach each other). Also, when the relative speed is negative (in a direction in which objects move away from each other), the TTC is provisionally set to infinity. The TTC is an indicator value indicating that the "degree of proximity" increases as the value decreases. The fact that the "first condition" is satisfied indicates, for example, that the TTC is less than a first threshold Th1. The first threshold Th1 is, for example, a value of about 1.1 to 1.9 [sec]. Instead of the TTC, an indicator value having a similar property thereto, for example, a headway time, a distance, or another indicator value, may be used as the "degree of proximity" Also, the TTC adjusted in consideration of acceleration and jerk may be used as the "degree of proximity" In the following description, it is assumed that the "degree of proximity" is the TTC.

When the TTC is less than the first threshold Th1, for example, the braking controller 110 instructs the brake device 310 and/or the travel driving force output device 300 to output a braking force for decelerating the vehicle M at first deceleration B1. The first deceleration B1 is, for example, a deceleration of about 0.1 to 0.9 [G] (close to 1). Thereby, the braking controller 110 causes the vehicle M to quickly decelerate and stop and avoids a collision with the target object TO. The ECU of the brake device 310 or the travel driving force output device 300 has a function of obtaining a brake output, a regeneration control amount, an engine brake amount, or the like from instruction-specific deceleration. The ECU decides on each control amount on the basis of the instruction-specific deceleration and the speed of the vehicle M. This is well-known technology and detailed description thereof will be omitted.

The operation of the first preliminary operation controller 112 will be described below and the steering-based avoidance controller 120 will be described first.

Figure 4:
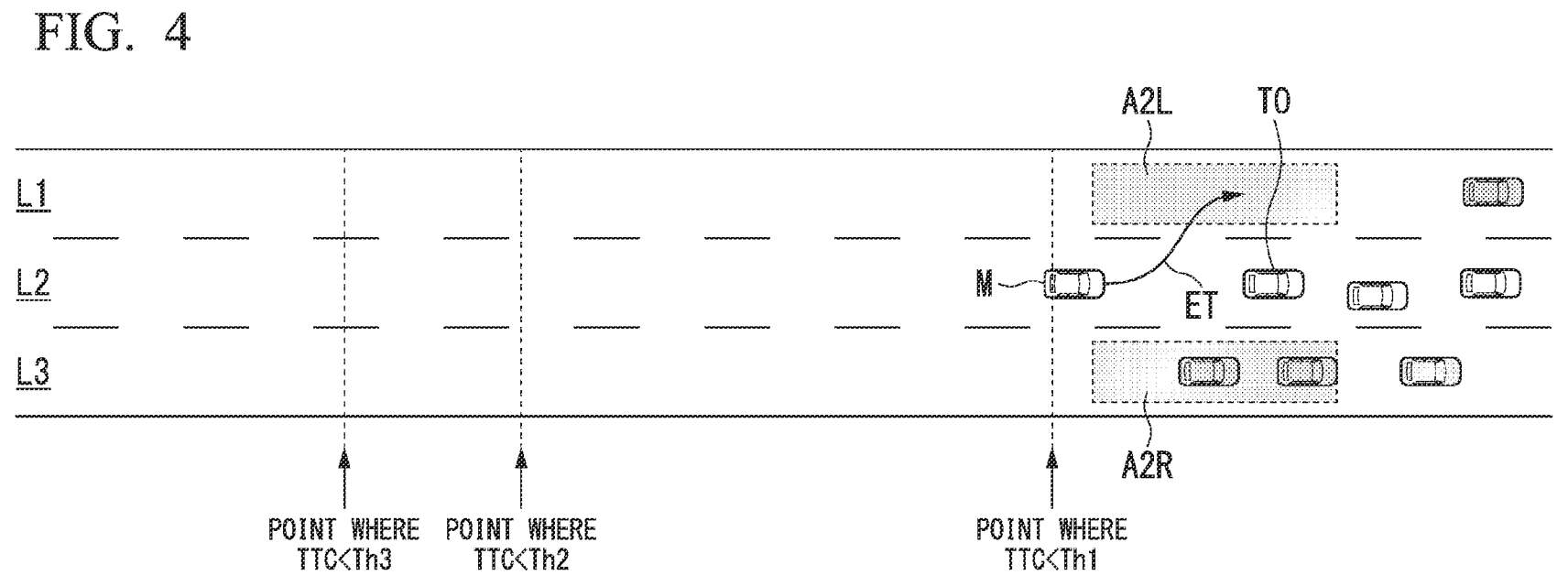

FIG. 4 is a diagram showing an example of an operation scene of the steering-based avoidance controller 120. The steering-based avoidance controller 120 determines whether or not there is a space where the vehicle M is able to travel in a travel path (for example, a lane L1 or L2) on a lateral side of the target object TO when it is determined that it is difficult for the braking controller 110 to stop the vehicle M in front of the target object TO, generates an avoidance trajectory ET when it is determined that there is a space, and issues an instruction to the steering device 320 so that the vehicle M travels along the avoidance trajectory ET (steering-based avoidance). For example, the steering-based avoidance controller 120 determines whether or not an object is located in lateral side areas extending slightly in front of and behind the target vehicle on both lateral sides of the target vehicle TO, such as areas A2L and A2R shown in FIG. 4, and determines that there is a space where the vehicle M is able to travel in a travel path on a lateral side of the target object TO when there is no object. The determination of whether or not it is difficult for the braking controller 110 to stop the vehicle M in front of the target object TO may be made by the braking controller 110, or may be made by the steering-based avoidance controller 120. The steering-based avoidance controller 120 may also recognize a boundary of a travel path by, for example, recognizing a white line or a road shoulder of a camera image, and determine that an object is located in an area when neither of the available travel areas A2L and A2R is present, for example, when neither of the lanes L1 and L3 is present.

Steering-based avoidance is performed in a situation in which a sudden change in the surrounding environment of the vehicle has occurred such as a situation in which a target object TO decelerates unexpectedly or an object different from a recognized target object TO intervenes between the vehicle M and the target object TO and is set as a new target vehicle TO. In this situation, there is a possibility that a countermeasure cannot be taken at deceleration calculated in advance so that the vehicle stops in front of the target vehicle TO, but it is possible to increase a probability that sudden changes in the surrounding environment of the vehicle can be coped with by providing a steering-based avoidance function.

[Preliminary Operation]

Figure 5:
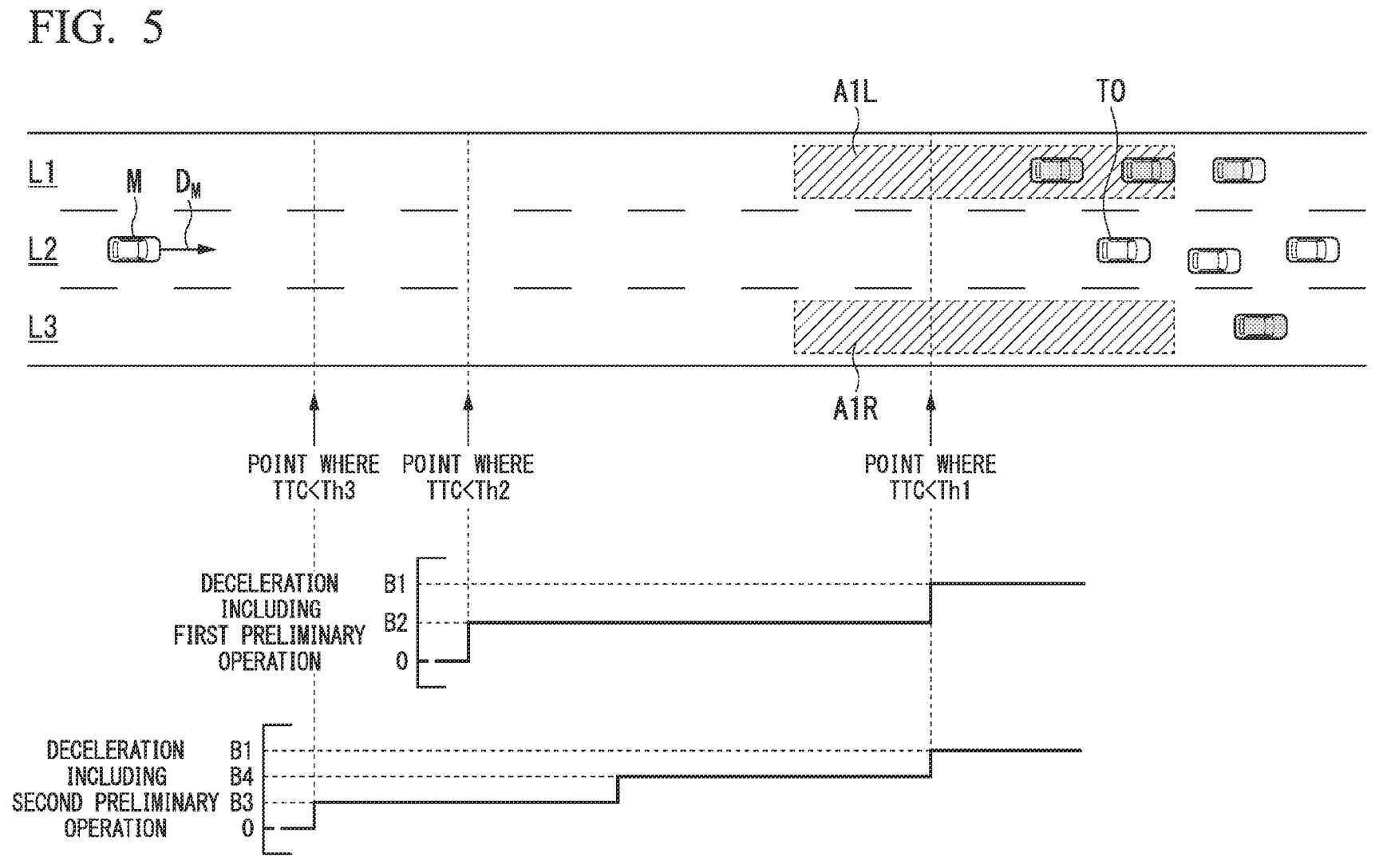

The processes of the first preliminary operation controller 112 and the second preliminary operation controller 130 will be described below. FIG. 5 is a diagram for describing a preliminary operation.

When a degree of proximity between a target object TO and the vehicle M satisfies a second condition (for example, when the TTC is less than a second threshold Th2), the first preliminary operation controller 112 performs a first preliminary operation for notifying a driver of the vehicle M of the presence of the target object TO. The first preliminary operation is, for example, an operation of instructing the brake device 310 and/or the travel driving force output device 300 to output a braking force for decelerating the vehicle M at second deceleration B2 from the time when the TTC is less than the second threshold Th2 to the time when the TTC is less than the first threshold Th1. The second deceleration B2 is deceleration less than the first deceleration B1 (or close to zero). The second threshold Th2 is a value larger than the first threshold Th1. Accordingly, the first condition is a condition that is satisfied when the degree of proximity is higher than that of the second condition.

When it is determined that the degree of proximity between the target object TO and the vehicle M satisfies a third condition (for example, the TTC is less than a third threshold Th3) and there is no available travel space in both travel paths on lateral sides of the target object TO after the vehicle M avoids a collision with the target object TO in steering at the time point when the third condition is satisfied, the second preliminary operation controller 130 performs a second preliminary operation of notifying the driver of the vehicle M of the presence of the target object TO. A determination related to the available travel space is made by the steering-based avoidance possibility determiner 132. The third threshold Th3 is a value larger than the second threshold Th2. Accordingly, the second condition is a condition that is satisfied when the degree of proximity is higher than that of the third condition.

For example, the steering-based avoidance possibility determiner 132 determines whether or not an object is located within lateral side areas extending slightly in front of and behind the target vehicle on both lateral sides of the target vehicle TO, such as areas A1L and A1R shown in FIG. 5, for example, at a time point when the TTC is less than the third threshold Th3, and determines that there is a space where the vehicle M is able to travel in a travel path on the lateral side of the target object TO when there is no object. The areas A1L and A1R are set to be larger than the areas A2L and A2R, respectively, for example, in consideration of future uncertain factors. Like the steering-based avoidance controller 120, the steering-based avoidance possibility determiner 132 may also recognize the boundary of the travel path by recognizing a white line and a road shoulder in a camera image and determine that an object is located in the area when neither of the available travel areas A1L and A1R is present, for example, when neither of the lanes L1 and L3 is present. In the example of FIG. 5, because there is no object in the area A1R, the steering-based avoidance possibility determiner 132 determines that there is a space where the vehicle M is able to travel in a travel path on the lateral side of the target object TO.

The second preliminary operation is, for example, an operation of instructing the brake device 310 and/or the travel driving force output device 300 to output a braking force for decelerating the vehicle M at third deceleration B3 from the time when the TTC is less than the third threshold Th3 to the time when the TTC is less than the first threshold Th1 and subsequently instructing the brake device 310 and/or the travel driving force output device 300 to output a braking force for decelerating the vehicle M at fourth deceleration B4. The third deceleration B3 is, for example, deceleration less than the second deceleration B2 (or close to zero), and the fourth deceleration B4 is deceleration greater than or substantially equal to the second deceleration and less than the first deceleration B1. A timing when the deceleration is switched from the third deceleration B3 to the fourth deceleration B4 may be set arbitrarily.

Thus, a start timing of the second preliminary operation is earlier than that of the first preliminary operation and the second preliminary operation is performed in multiple steps. As described above, in a situation in which steering-based avoidance is possible, a probability that any sudden change in the surrounding environment of the vehicle can be coped with quickly becomes high and a degree of control margin becomes relatively high. On the other hand, because it is difficult to execute a steering-based avoidance function even if the steering-based avoidance function is provided when there is no avoidance space on the lateral side of the target object, a degree of control margin is no different from that of a vehicle that performs only an automated stop operation. That is, it is preferable to warn the driver of the vehicle M more quickly and effectively in a situation in which steering-based avoidance is difficult than in a situation in which steering-based avoidance is possible. According to the present embodiment, a start timing of the second preliminary operation is earlier than that of the first preliminary operation and the second preliminary operation is performed in multiple steps, and therefore it is possible to perform an appropriate preliminary operation corresponding to the surrounding situation of the target object.

Figure 6:
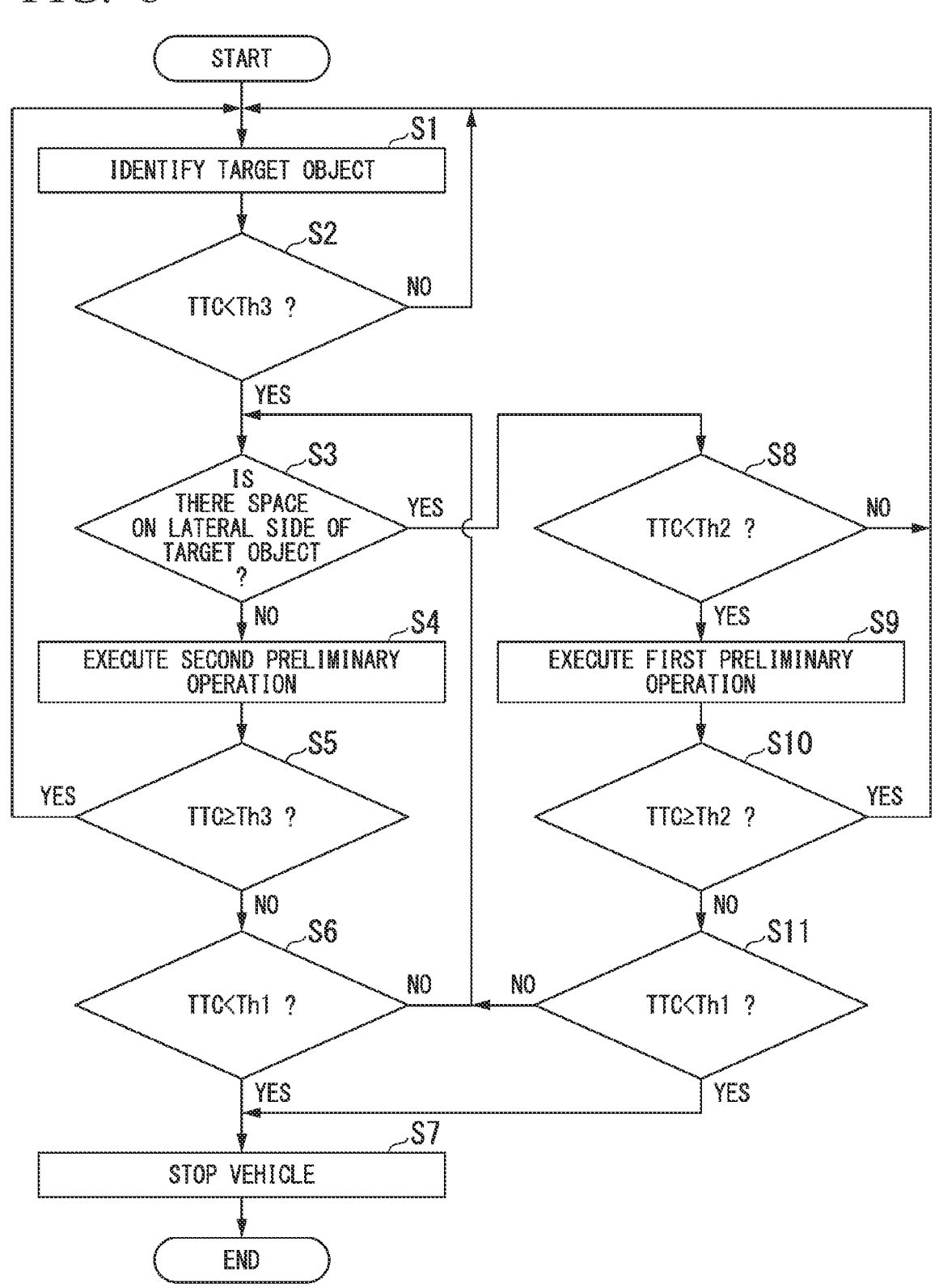
FIG. 6 is a flowchart (part 1) showing an example of a flow of a process executed by the driving assistance device.

FIG. 6 is a flowchart (part 1) showing an example of a flow of a process executed by the driving assistance device 100.

First, the braking controller 110 identifies a target object TO (step S1). Subsequently, the second preliminary operation controller 130 determines whether or not TTC between the vehicle M and the target object TO is less than the third threshold Th3 (step S2). When the TTC between the vehicle M and the target object TO is greater than or equal to the third threshold Th3, the process returns to step S1.

When it is determined that the TTC between the vehicle M and the target object TO is less than the third threshold Th3, the steering-based avoidance possibility determiner 132 of the second preliminary operation controller 130 determines whether or not there is a space where the vehicle M is able to travel in a travel path on a lateral side of the target object TO (step S3).

When it is determined that there is no space where the vehicle M is able to travel in the travel path on the lateral side of the target object TO, the second preliminary operation controller 130 executes the second preliminary operation (step S4). Subsequently, the second preliminary operation controller 130 determines whether or not the TTC between the vehicle M and the target object TO has increased to a value greater than or equal to the third threshold Th3 (step S5). When it is determined that the TTC between the vehicle M and the target object TO has increased to a value greater than or equal to the third threshold Th3, the process returns to step S1.

When it is determined that the TTC between the vehicle M and the target object TO has not increased to a value greater than or equal to the third threshold Th3, the braking controller 110 determines whether or not the TTC between the vehicle M and the target object TO is less than the first threshold Th1 (step S6). When it is determined that the TTC between the vehicle M and the target object TO is greater than or equal to the first threshold Th1, the process returns to step S3. When an affirmative determination has been obtained in step S3, the second preliminary operation is stopped and the processing from step S8 is executed. When it is determined that the TTC between the vehicle M and the target object TO is less than the first threshold Th1, the braking controller 110 causes the vehicle M to decelerate and stop by causing the brake device 310 and/or the travel driving force output device 300 to output a braking force for decelerating the vehicle M at the first deceleration B1 (step S7). At this time, as described above, in place of (or in addition to) decelerating and stopping the vehicle M, steering-based avoidance may be performed.

When an affirmative determination has been obtained in step S3, i.e., when the TTC between the vehicle M and the target object TO is less than the third threshold Th3, and there is a space where the vehicle M is able to travel in the travel path on the lateral side of the target object TO, the first preliminary operation controller 112 of the braking controller 110 determines whether or not the TTC between the vehicle M and the target object TO is less than the second threshold Th2 (step S8). When it is determined that the TTC between the vehicle M and the target object TO is greater than or equal to the second threshold Th2, the process returns to step S1.

When it is determined that the TTC between the vehicle M and the target object TO is less than the second threshold Th2, the first preliminary operation controller 112 executes the first preliminary operation (step S9). Subsequently, the first preliminary operation controller 112 determines whether or not the TTC between the vehicle M and the target object TO has increased to a value greater than or equal to the second threshold Th2 (step S10). When it is determined that the TTC between the vehicle M and the target object TO has increased to a value greater than or equal to the second threshold Th2, the process returns to step S1.

When it is determined that the TTC between the vehicle M and the target object TO has not increased to a value greater than or equal to the second threshold Th2, the braking controller 110 determines whether or not the TTC between the vehicle M and the target object TO is less than the first threshold Th1 (step S11). When it is determined that the TTC between the vehicle M and the target object TO is greater than or equal to the first threshold Th1, the process returns to step S3. When a negative determination has been obtained in step S3, the first preliminary operation is stopped and the processing from step S4 is executed. When it is determined that the TTC between the vehicle M and the target object TO is less than the first threshold Th1, the braking controller 110 causes the brake device 310 and/or the travel driving force output device 300 to output the first deceleration B1 and causes the vehicle M to decelerate and stop (step S7).

[Automated Driving Control Device]

FIG. 7 is a configuration diagram of the automated driving control device 200. The automated driving control device 200 includes, for example, a first controller 220 and a second controller 260. Each of the first controller 220 and the second controller 260 is implemented, for example, by a hardware processor such as a CPU executing a program (software). Also, some or all of the above components may be implemented by hardware (including a circuit; circuitry) such as an LSI circuit, an ASIC, an FPGA, or a GPU or may be implemented by software and hardware in cooperation. The program may be pre-stored in a storage device (a storage device including a non-transitory storage medium) such as an HDD or a flash memory of the automated driving control device 200 or may be stored in a removable storage medium such as a DVD or a CD-ROM and installed in the HDD or the flash memory of the automated driving control device 200 when the storage medium (the non-transitory storage medium) is mounted in a drive device. The automated driving control device 200 is an example of a "vehicle control device" and a combination of the action plan generator 240 and the second controller 260 is an example of a "driving controller."

The first controller 220 includes, for example, a recognizer 230, the action plan generator 240, and a mode decider 250. For example, the first controller 220 implements a function based on artificial intelligence (AI) and a function based on a previously given model in parallel. For example, an "intersection recognition" function may be implemented by executing intersection recognition based on deep learning or the like and recognition based on previously given conditions (signals, road signs, or the like with which pattern matching is possible) in parallel and performing comprehensive evaluation by assigning scores to both recognition processes. Thereby, the reliability of automated driving is ensured.

Also, the recognizer 230 recognizes states of positions, speeds, acceleration, and the like of the objects located near the host vehicle M on the basis of information input from the camera 10, the radar device 12, and the LIDAR sensor 14 via the object recognition device 16. For example, the position of the object is recognized as a position in relative coordinates with a representative point (a center of gravity, a driving shaft center, or the like) of the host vehicle M as the origin and is used for control. The position of the object may be represented by a representative point such as a center of gravity or a corner of the object or may be represented by an area. The "state" of an object may include acceleration or jerk of the object or an "action state" (for example, whether or not a lane change is being made or intended).

Also, the recognizer 230 recognizes, for example, a lane in which the host vehicle M is traveling (a traveling lane). For example, the recognizer 230 recognizes the traveling lane by comparing a pattern of road markings (for example, an arrangement of solid lines and dashed lines) obtained from the second map information 62 with a pattern of road markings near the host vehicle M recognized from an image captured by the camera 10. The recognizer 230 may recognize the traveling lane by recognizing a travel path boundary (a road boundary) including a road marking, a road shoulder, a curb, a median strip, a guardrail, or the like as well as a road marking. In this recognition, a position of the host vehicle M acquired from the navigation device 50 or a processing result of the INS may be taken into account. Also, the recognizer 230 may recognize a temporary stop line, an obstacle, a red traffic light, a toll gate, and other road events.

When the traveling lane is recognized, the recognizer 230 recognizes a position or an orientation of the host vehicle M with respect to the traveling lane. For example, the recognizer 230 may recognize a gap of a reference point of the host vehicle M from the center of the lane and an angle formed with respect to a line connected to the center of the lane in the traveling direction of the host vehicle M as a relative position and orientation of the host vehicle M related to the traveling lane. Alternatively, the recognizer 230 may recognize a position of the reference point of the host vehicle M related to one side end portion (a road marking or a road boundary) of the traveling lane or the like as a relative position of the host vehicle M related to the traveling lane.

The action plan generator 240 generates a future target trajectory along which the host vehicle M will automatically travel (independently of the driver's operation) so that the host vehicle M can generally travel in the recommended lane determined by the recommended lane decider 61 and further cope with a surrounding situation of the host vehicle M. For example, the target trajectory includes a speed element. For example, the target trajectory is represented by sequentially arranging points (trajectory points) at which the host vehicle M is required to arrive. The trajectory points are points at which the host vehicle M is required to arrive for each prescribed traveling distance (for example, about several meters [m]) along a road. In addition, a target speed and target acceleration for each prescribed sampling time (for example, about 0.1 to 0.9 [sec]) are generated as parts of the target trajectory. Also, the trajectory point may be a position at which the host vehicle M is required to arrive at the sampling time for each prescribed sampling time. In this case, information of the target speed or the target acceleration is represented by an interval between the trajectory points.

When the target trajectory is generated, the action plan generator 240 may set automated driving events. The automated driving events include, for example, a constant-speed traveling event, a low-speed tracking traveling event, a lane change event, a branching-point-related movement event, a merging-point-related movement event, a takeover event, and the like. The action plan generator 240 generates a target trajectory corresponding to an activated event.

The mode decider 250 decides on a driving mode of the host vehicle M as one of a plurality of driving modes having different tasks imposed on the driver. The mode decider 250 includes, for example, a driver state determiner 252 and a mode change processor 254. These individual functions will be described below.

FIG. 8 is a diagram showing an example of corresponding relationships between the driving modes, the control states of the host vehicle M, and the tasks. For example, there are five modes from mode A to mode E as the driving modes of the host vehicle M. A control state, i.e., a degree of auto- mation of the driving control of the host vehicle M, is highest in mode A, lower in the order of mode B, mode C, and mode D, and lowest in mode E. In contrast, a task imposed on the driver is lightest in mode A, heavier in the order of mode B, mode C, and mode D, and heaviest in mode E. Because of a control state that is not automated driving in modes D and E, the automated driving control device 200 is responsible for ending control related to automated driving and shifting the driving mode to driving assistance or manual driving. The content of the driving modes will be exemplified below.

In mode A, neither forward monitoring nor gripping of the steering wheel 82 (a steering grip in FIG. 8) is imposed on the driver. However, even in mode A, the driver is required to be in a posture where a fast shift to manual driving is possible in response to a request from the system centered on the automated driving control device 200. Also, the term "automated driving" as used herein indicates that both steering and acceleration/deceleration are controlled inde- pendently of the operation of the driver. The term "forward region or direction" indicates a space in a traveling direction of the host vehicle M that is visually recognized via the front windshield. Mode A is a driving mode in which the host vehicle M travels at a prescribed speed (for example, about 50 [km/h]) or less on a motorway such as an expressway and which can be executed when a condition in which there is a tracking target preceding vehicle or the like is satisfied. Mode A may be referred to as a traffic jam pilot (TJP). When this condition is no longer satisfied, the mode decider 250 changes the driving mode of the host vehicle M to mode B.

In mode B, a task of monitoring a forward direction of the host vehicle M (hereinafter referred to as forward monitor- ing) is imposed on the driver, but a task of gripping the steering wheel 82 is not imposed on the driver. In mode C, a forward monitoring task and a task of gripping the steering wheel 82 are imposed on the driver. In mode D, a task in which a certain degree of driving operation is required for at least one of steering, acceleration, and deceleration of the host vehicle M is imposed on the driver. For example, in mode D, driving assistance such as adaptive cruise control (ACC) or a lane keeping assist system (LKAS) is performed by a driving assistance device (not shown) separate from the driving assistance device 100. In mode E, manual driving in which a task requiring a driving operation for both steering and acceleration/deceleration is imposed on the driver is performed. In both modes D and E, a task of monitoring a forward direction of the host vehicle M is naturally imposed on the driver. Modes A and B are examples of a "first state" and mode C is an example of a "second state." Also, modes D and E are examples of a "state in which the automated driving control device is not operating."

The mode decider 250 changes the driving mode of the host vehicle M to a driving mode in which a task is heavier when the task associated with the decided driving mode (hereinafter referred to as a current driving mode) is not executed by the driver.

For example, in mode A, when the driver is in a posture where he/she cannot shift the driving to manual driving in response to a request from the system (for example, when he/she continues to look outside an allowable area or when a sign that driving is difficult is detected), the mode decider 250 performs a control process of prompting the driver to shift the driving to manual driving using the HMI 30, causing the host vehicle M to gradually stop close to the road shoulder when the driver does not respond, and stopping the automated driving. After the automated driving is stopped, the host vehicle M is in a state of mode D or E. Thereby, the host vehicle M can be started according to the manual driving of the driver. Hereinafter, the same is true for "stopping of automated driving." When the driver is not performing forward monitoring in mode B, the mode decider 250 performs a control process of prompting the driver to perform the forward monitoring using the HMI 30, causing the host vehicle M to gradually stop close to the road shoulder when the driver does not respond, and stopping the automated driving. When the driver is not performing forward monitoring or is not gripping the steering wheel 82 in mode C, the mode decider 250 performs a control process of prompting the driver to perform the forward monitoring and/or grip the steering wheel 82 using the HMI 30, causing the host vehicle M to gradually stop close to the road shoulder when the driver does not respond, and stopping the automated driving.

The driver state determiner 252 monitors the driver's state for the above-described mode change and determines whether or not the driver's state corresponds to the task. For example, the driver state determiner 252 performs a posture estimation process by analyzing the image captured by the driver monitor camera 70 and determines whether or not the driver is in a posture in which it is difficult to shift the driving to manual driving in response to a request from the system. The driver state determiner 252 performs a visual line estimation process by analyzing the image captured by the driver monitor camera 70 and determines whether or not the driver is performing forward monitoring.

The mode change processor 254 performs various types of processes for the mode change. For example, the mode change processor 254 instructs the action plan generator 240 to generate a target trajectory for stopping on the road shoulder or controls the HMI 30 to prompt the driver to take action.

The second controller 260 controls the travel driving force output device 300, the brake device 310, and the steering device 320 so that the host vehicle M passes along the target trajectory generated by the action plan generator 240 at the scheduled times.

[Control Corresponding to State of Automated Driving]

Hereinafter, preliminary operation control corresponding to the state of automated driving will be described. The driving assistance device 100 acquires information about an operating state (which mode it is in) from the automated driving control device 200 and performs the following control.

When the automated driving control device 200 is operating in mode C, the second preliminary operation controller 130 makes an operation start condition of the second preliminary operation loose (or changes the operation start condition so that the operation is easy) as compared with when the automated driving control device 200 is not operating (i.e., in either mode D or E).

For example, "making the operation start condition of the second preliminary operation loose" includes, for example, some or all of (1) increasing a braking force to be output in at least a part of the second preliminary operation, (2) advancing a start timing of the second preliminary operation (specifically, increasing a third threshold Th3), (3) advancing a timing when the braking force is increased from third deceleration B3 to fourth deceleration B4 in the second preliminary operation (specifically, changing a criterion for increasing the braking force to the fourth deceleration so that the timing is advanced), and the like.

Figure 9:
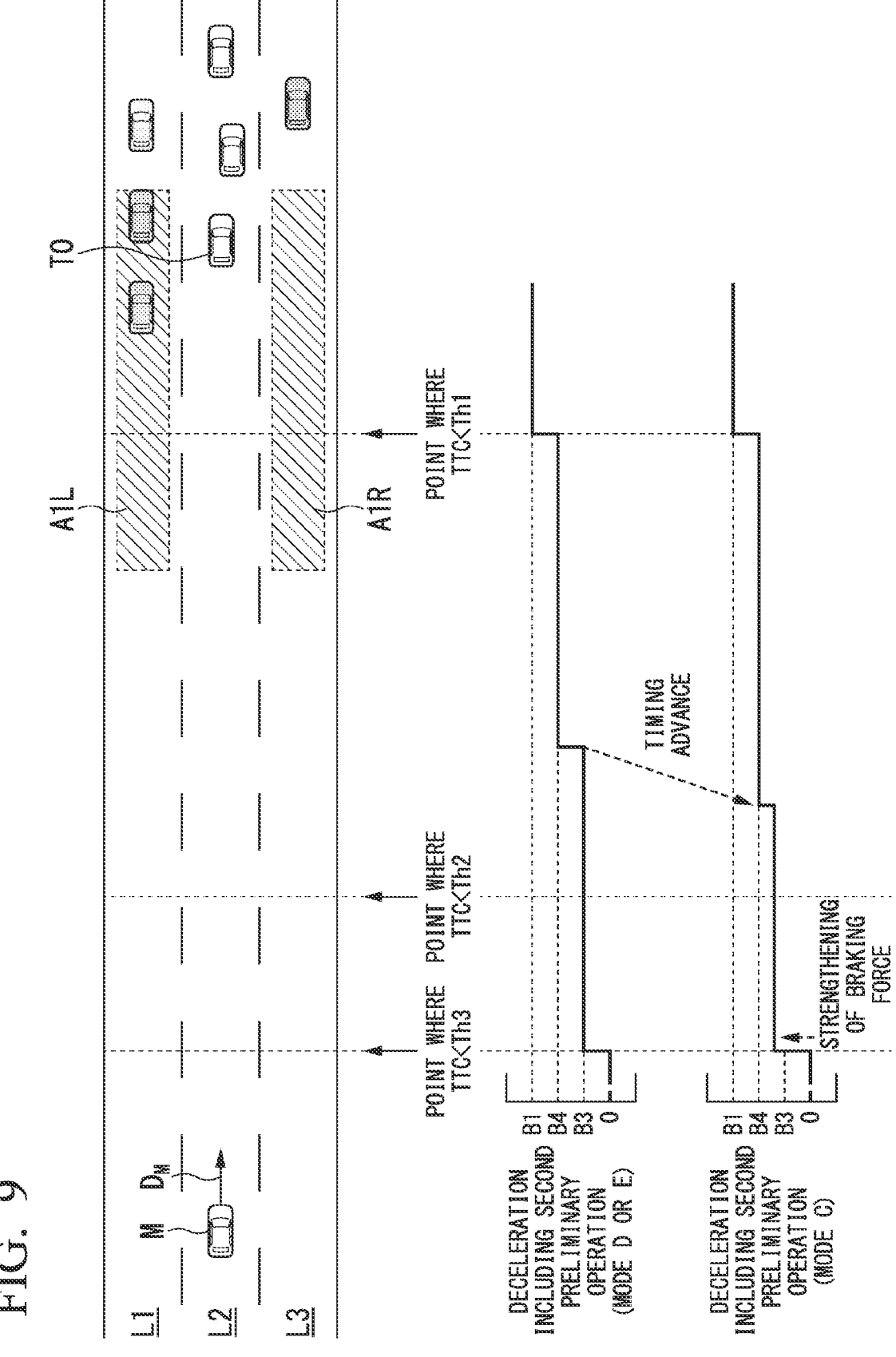
FIG. 9 is a diagram showing an example of a state in which a second preliminary operation is different between a case where the automated driving control device is not operating (a case where the vehicle is in mode D or E) and a case where the automated driving control device is operating in mode C.

FIG. 9 is a diagram showing an example of a state in which the second preliminary operation is different between a case where the automated driving control device 200 is not operating (a case where the vehicle is in mode D or E) and a case where the automated driving control device 200 is operating in mode C. As shown in FIG. 9, when the automated driving control device 200 is operating in mode C, the brake device 310 or the like is controlled so that the braking force to be initially output is larger and a timing when the braking force is increased to the fourth deceleration B4 is advanced as compared with when the automated driving control device 200 is not operating.

A case where the automated driving control device 200 is operating in mode C is a state in which the driver is gripping the steering wheel 82, but the automated driving control device 200 controls the acceleration and deceleration of the vehicle M. In such a state, the driver does not necessarily have his/her foot near the brake pedal, and may not be able to quickly cope with a case where sudden braking is required. Therefore, the second preliminary operation controller 130 can notify the driver of a forward situation early by making the operation start condition of the second preliminary operation loose as described above and can guide the driver to perform necessary braking.

Also, the second preliminary operation controller 130 makes the operation start condition of the second preliminary operation strict (the operation start condition is changed so that the operation is difficult) when the automated driving control device 200 is operating in mode A or B as compared with when the automated driving control device 200 is not operating (i.e., when it is in either mode D or E).

In contrast to "making the operation start condition loose," "making the operation start condition of the second preliminary operation strict" includes some or all of (A) decreasing the braking force to be output in at least a part of the second preliminary operation, (B) delaying the start timing of the second preliminary operation (specifically, decreasing the third threshold Th3), and (C) delaying a timing when the braking force is increased from the third deceleration B3 to the fourth deceleration B4 in the second preliminary operation (specifically, changing a criterion for increasing the braking force to the fourth deceleration B4 so that the timing is delayed).

When the automated driving control device 200 is operating in mode A or B, the driver transfers both steering and acceleration/deceleration to the vehicle M. In this state, if the strong second preliminary operation is suddenly activated, the user may feel uncomfortable. Therefore, the second preliminary operation controller 130 can prevent the driver from feeling uncomfortable by making the operation start condition of the second preliminary operation strict as described above.

Also, when the automated driving control device 200 is operating in mode A or B, the second preliminary operation controller 130 may cause the HMI 30 to output information for prompting the driver to grip the steering wheel 82 in synchronization with the second preliminary operation. Synchronization with the second preliminary operation indicates, for example, that the operation is performed at a timing when the vehicle M is decelerated at the third deceleration B3, a timing when the vehicle M is decelerated at the fourth deceleration B4, or a timing determined to be a prescribed time period earlier or later than the above timing. Preferably, the information may be output to the HMI 30 at a timing that is slightly earlier than the timing when the vehicle M is decelerated at the fourth deceleration B4. After causing the HMI 30 to output the information, the second preliminary operation controller 130 may advance the operation timing of the second preliminary operation when the driver has not gripped the steering wheel 82 as compared with when the driver has gripped the steering wheel 82. The process of causing the HMI 30 to output information may be performed via the automated driving control device 200 or may be performed by the automated driving control device 200 while an activation timing of the second preliminary operation is being observed. Also, instead of the above, at the stage when the second preliminary operation is expected to be executed (the stage at which it is not determined whether the second preliminary operation will be actually performed), information for prompting the driver to grip the steering wheel 82 may be allowed to be output by the HMI 30. For example, the second preliminary operation controller 130 may predict that the second preliminary operation will be executed when a condition looser than a start condition of the second preliminary operation is satisfied or may observe a change in TTC or the like in chronological order and predict that the second preliminary operation will be executed in a situation in which the second preliminary operation is started after a prescribed time period in a case where the TTC has changed in a current trend.

Figure 10:
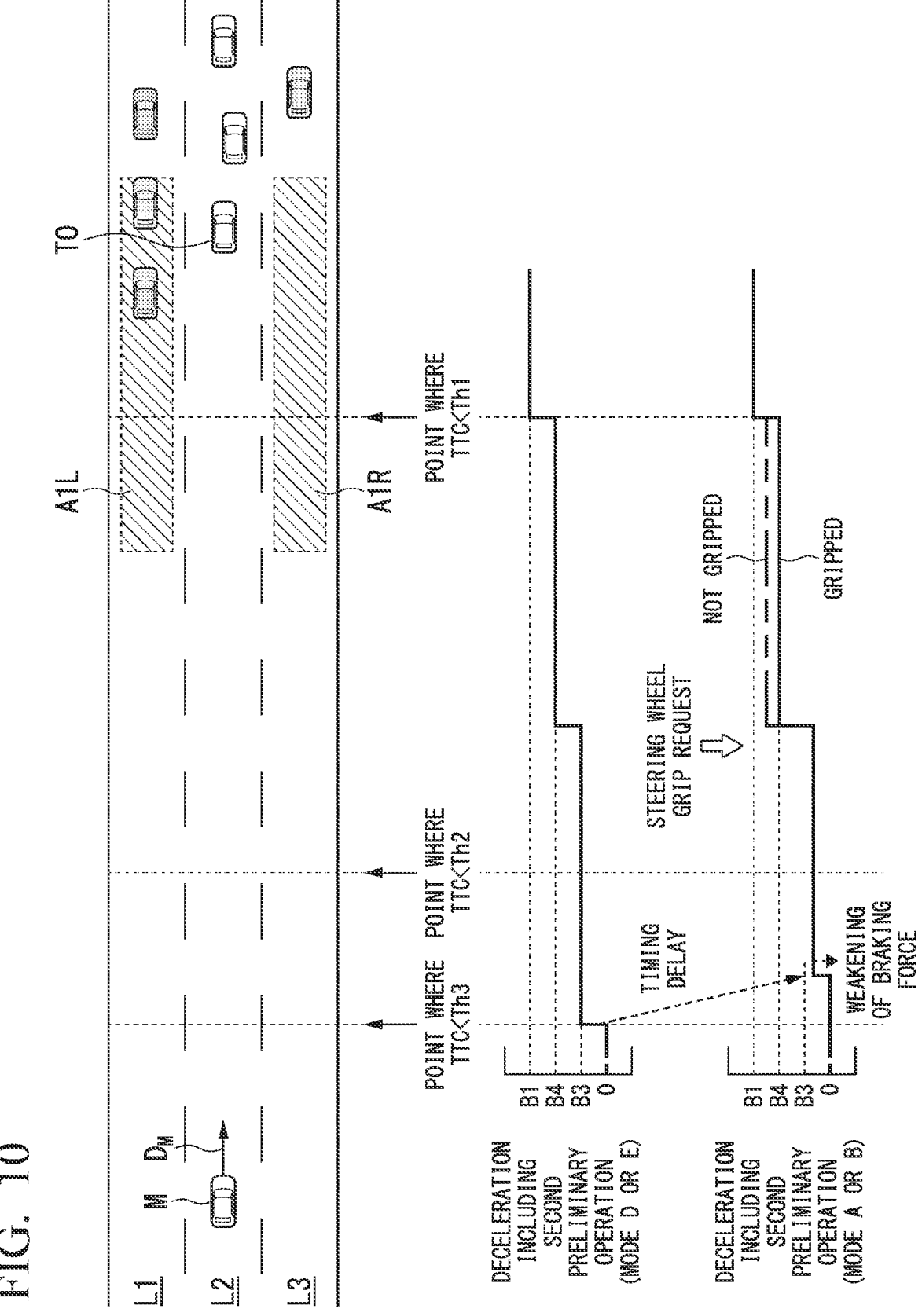
FIG. 10 is a diagram showing an example of a state in which the second preliminary operation is different between a case where the automated driving control device is not operating (a case where the vehicle is in mode D or E) and a case where the automated driving control device is operating in mode A or B.

FIG. 10 is a diagram showing an example of a state in which the second preliminary operation is different between a case where the automated driving control device 200 is not operating (a case where the vehicle is in mode D or E) and a case where the automated driving control device 200 is operating in mode A or B. As shown in FIG. 10, the output of the braking force is started at a later timing and with a smaller braking force when the automated driving control device 200 is operating in mode A or B than when the automated driving control device 200 is not operating. Also, after the HMI 30 is allowed to output information for prompting the driver to grip the steering wheel 82, the brake device 310 or the like is controlled so that the braking force output when the driver does not grip the steering wheel 82 is greater than the braking force output when the driver grips the steering wheel 82.

In addition to the above, when the automated driving control device 200 is operating in mode C, the first preliminary operation controller 112 may also be configured to make the operation start condition of the first preliminary operation loose as compared with when the automated driving control device 200 is not operating. Also, when the automated driving control device 200 is operating in mode A or B, the first preliminary operation controller 112 may also be configured to make the operation start condition of the first preliminary operation strict as compared with when the automated driving control device 200 is not operating.

Figure 11:
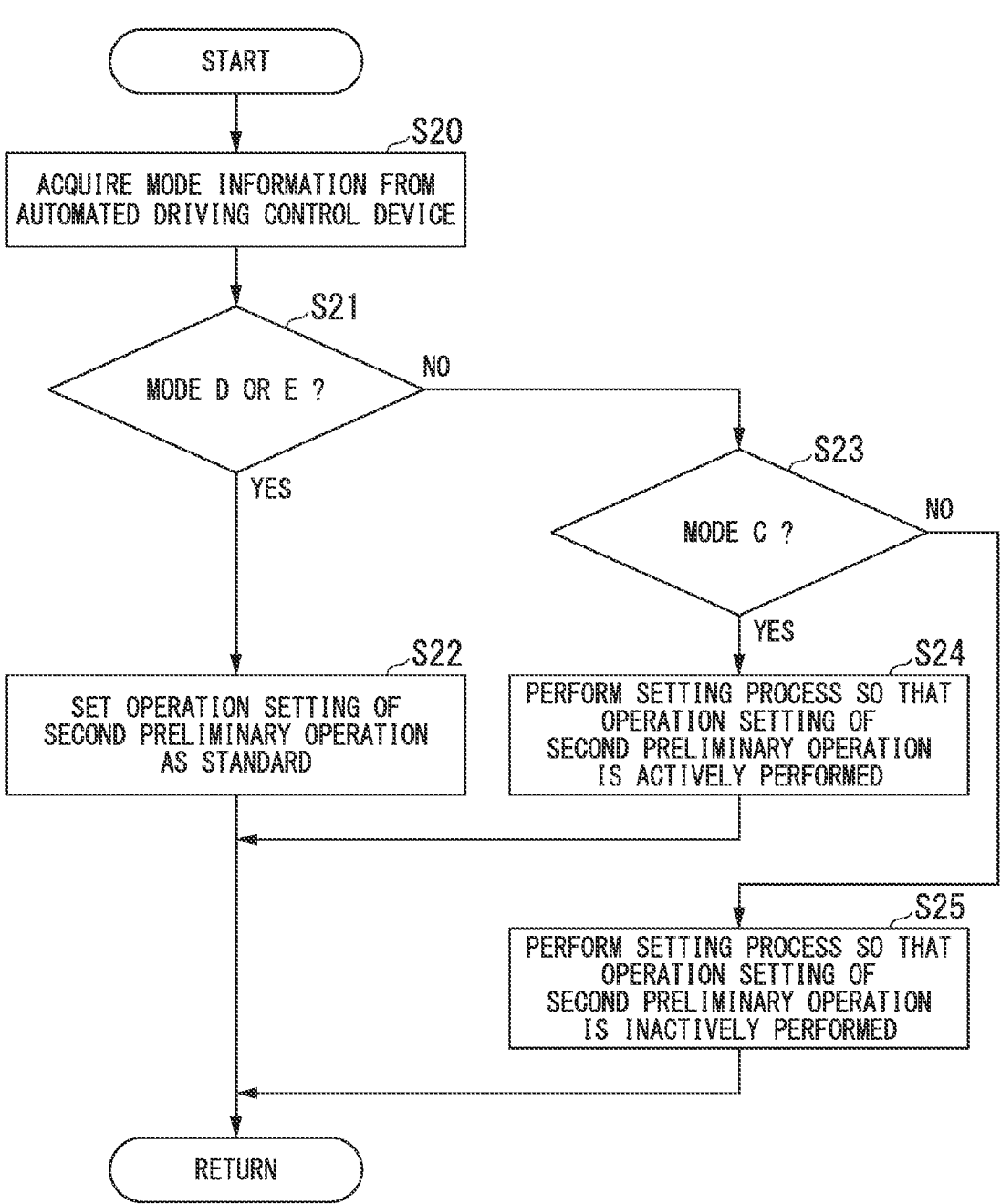
FIG. 11 is a flowchart (part 2) showing an example of a flow of a process executed by the driving assistance device.

FIG. 11 is a flowchart (part 2) showing an example of a flow of a process executed by the driving assistance device 100. First, the second preliminary operation controller 130 acquires current mode information from the automated driving control device 200 (step S20). Subsequently, the second preliminary operation controller 130 determines whether the current mode is mode D or mode E (step S21). When the current mode is mode D or mode E, the second preliminary operation controller 130 sets the operation setting of the second preliminary operation as a standard (step S22). The standard is, for example, the operation setting for performing the operation exemplified in FIG. 5. When the current mode is neither mode D nor mode E, the second preliminary operation controller 130 determines whether or not the current mode is mode C (step S23). When the current mode is mode C, the second preliminary operation controller 130 performs a setting process so that the operation setting of the second preliminary operation is actively performed (or so that the operation start condition is loose) (step S24). When the current mode is not mode C, i.e., when the current mode is mode A or mode B, the second preliminary operation controller 130 performs a setting process so that the operation setting of the second preliminary operation is inactively performed (or so that the operation start condition is strict) (step S25).

According to the above-described embodiment, it is possible to perform an appropriate preliminary operation corresponding to the state of automated driving.

In the above-described embodiment, in either the first preliminary operation or the second preliminary operation, a display process, a sound output process, a vibration output process, or the like as an alert may be performed instead of outputting the braking force. In this case, examples of "making the operation start condition of the second preliminary operation loose" include a process of strengthening the color and contrast of display, a process of strengthening a tone of displayed text, a process of increasing a sound volume, a process of strengthening vibrations, or a process of advancing timings thereof. Also, examples of "making the operation start condition of the second preliminary operation strict" include a process of weakening the color and contrast of display, a process of weakening a tone of displayed text, a process of decreasing a sound volume, a process of weakening vibrations, or a process of delaying timings thereof.

In the above-described embodiment, when the branch road to the destination set in the navigation device 50 is located on the left or right side of the lane in which the vehicle M is traveling, the lane change may be forcedly made during the preliminary operation. Thus, consequently, it is possible to move the vehicle M in a direction closer to the destination and guide the vehicle M in a state in which the object serving as the target object is not located near the vehicle M.

Although modes for carrying out the present invention have been described above using embodiments, the present invention is not limited to the embodiments and various modifications and substitutions can also be made without departing from the scope and spirit of the present invention.

What is claimed is:

1. A driving assistance device mounted in a vehicle with an automated driving control device for automatically controlling steering, acceleration, and deceleration of the vehicle in either of a first state in which a driver is not gripping a steering operation element and a second state in which the driver is gripping the steering operation element, the driving assistance device comprising:

a storage medium storing computer-readable instructions; and at least one processor connected to the storage medium, the at least one processor executing the computer-readable instructions to:

refer to an output of a detection device for detecting that a first object is located in front of the vehicle;

recognize a lane where the vehicle is located based on the output of the detection device;

detect, based on a sensor output, whether the driver is gripping the steering operation element;

determine an avoidance trajectory to avoid a collision with the first object by steering based on the output of the detection device;

execute one or both of instructing a brake device of the vehicle to stop the vehicle or instructing a steering device of the vehicle to avoid a collision with the first object by steering in response to determining that an indicator value that decreases as the vehicle approaches the first object is less than a first threshold;

execute a first preliminary operation in response to determining that the indicator value is less than a second threshold;

execute a second preliminary operation in response to determining that the indicator value is less than a third threshold and determining, at a time point when the indicator value is less than the third threshold, that there is no available travel path along which the vehicle is able to travel on either lateral side of a second object after the vehicle avoids the collision with the first object utilizing automatic steering control; and accelerate an operation start condition of the second preliminary operation when the automated driving control device is operating in the second state as compared with when the automated driving control device is not operating, wherein the first threshold is less than the second threshold and the second threshold is less than the third threshold, the second preliminary operation includes at least one of outputting braking force, displaying information, outputting sound, or outputting vibration, accelerating the operation start condition of the second preliminary operation includes at least one of increasing an amount of the braking force, advancing a start timing of the second preliminary operation, or strengthening an output mode of the displaying, the sound, or the vibration, the at least one processor causes an output device to output information for prompting the driver to grip the steering operation element in synchronization with the second preliminary operation when the automated driving control device is operating in the first state, after the output device is allowed to output the information, the at least one processor advances an operation timing of the second preliminary operation when the driver is not gripping the steering operation element as compared with when the driver is gripping the steering operation element, the second preliminary operation is performed in multiple steps, the vehicle has five driving modes from mode A to mode E, in mode A, neither a task of monitoring a forward direction of the vehicle nor a task of gripping of a steering wheel is imposed on the driver, in mode B, the task of monitoring the forward direction of the vehicle is imposed on the driver but the task of gripping the steering wheel is not imposed on the driver, in mode C, the task of monitoring the forward direction of the vehicle and the task of gripping the steering wheel are imposed on the driver, in mode D, a task in which a degree of driving operation is required for at least one of steering, acceleration, and deceleration of the vehicle is imposed on the driver, in mode E, manual driving in which both steering and acceleration/deceleration is required is performed, and the processor further executes the computer-readable instructions to:

when the automated driving control device is operating in the mode C, advance the operation timing of the second preliminary operation as compared with when the automated driving control device is operating in the mode D or E, and when the automated driving control device is operating in the mode A or B, delay the operation timing of the second preliminary operation as compared with when the automated driving control device is operating in the mode D or E.

2. The driving assistance device according to claim 1, wherein the first preliminary operation is an operation to output braking force, and wherein the at least one processor shifts the second threshold for the first preliminary operation to increase a likelihood that the second threshold will be satisfied by the indicator value when the automated driving control device is operating in the second state as compared with when the automated driving control device is not operating.

3. The driving assistance device according to claim 1, wherein the second preliminary operation is an operation that is started at an earlier timing than the first preliminary operation.

4. The driving assistance device according to claim 1, wherein at least one of the first preliminary operation or the second preliminary operation is an operation of instructing the brake device to output a braking force less than a braking force that the at least one processor instructs the brake device to output when a value obtained by dividing a distance between the first object and the vehicle by a relative speed is less than the first threshold.

5. The driving assistance device according to claim 4, wherein both the first preliminary operation and the second preliminary operation are an operation of instructing the brake device to output a braking force less than a braking force that the at least one processor instructs the brake device to output when a value obtained by dividing a distance between the first object and the vehicle by a relative speed is less than the first threshold, and wherein a braking force initially output in the second preliminary operation is less than a braking force initially output in the first preliminary operation.

6. The driving assistance device according to claim 1, wherein the first preliminary operation is an operation of instructing an output device to perform a display process, a sound output process, or a vibration output process as an alert.

7. A vehicle control system comprising:

the driving assistance device according to claim 1; and the automated driving control device.

8. A driving assistance method executed using a driving assistance device mounted in a vehicle with an automated driving control device for automatically controlling steering, acceleration, and deceleration of the vehicle in either of a first state in which a driver is not gripping a steering operation element and a second state in which the driver is gripping the steering operation element, the driving assistance method comprising:

referring to an output of a detection device for detecting that a first object is located in front of the vehicle;

recognizing a lane where the vehicle is located based on the output of the detection device;

detecting, based on a sensor output, whether the driver is gripping the steering operation element;

determining an avoidance trajectory predicted to avoid a collision with the first object by steering based on the output of the detection device;

executing one or both of instructing a brake device of the vehicle to stop the vehicle or instructing a steering device of the vehicle to avoid a collision with the first object by steering when an indicator value that decreases as the vehicle approaches the first object is less than a first threshold;

executing a first preliminary operation when the indicator value is less than a second threshold;

executing a second preliminary operation in response to determining that the indicator value is less than a third threshold and determining, at a time point when the indicator value is less than the third threshold, that there is no available travel path along which the vehicle is able to travel on either lateral side of a second object after the vehicle avoids the collision with the first object utilizing automatic steering control;

accelerating an operation start condition of the second preliminary operation when the automated driving control device is operating in the second state as compared with when the automated driving control device is not operating;

causing an output device to output information for prompting the driver to grip the steering operation element in synchronization with the second preliminary operation when the automated driving control device is operating in the first state; and after the output device is allowed to output the information, advancing an operation timing of the second preliminary operation when the driver is not gripping the steering operation element as compared with the operation timing when the driver is gripping the steering operation element, wherein the first threshold is less than the second threshold and the second threshold is less than the third threshold, the second preliminary operation includes at least one of outputting braking force, displaying information, outputting sound, or outputting vibration, the accelerating of the operation start condition of the second preliminary operation includes at least one of increasing an amount of the braking force, advancing a start timing of the second preliminary operation, or strengthening an output mode of the displaying, the sound, or the vibration, the second preliminary operation is performed in multiple steps, the vehicle has five driving modes from mode A to mode E, in mode A, neither a task of monitoring a forward direction of the vehicle nor a task of gripping of a steering wheel is imposed on the driver, in mode B, the task of monitoring the forward direction of the vehicle is imposed on the driver and the task of gripping the steering wheel is not imposed on the driver, in mode C, the task of monitoring the forward direction and the task of gripping the steering wheel are imposed on the driver, in mode D, a task in which a degree of driving operation is required for at least one of steering, acceleration, and deceleration of the vehicle is imposed on the driver, and in mode E, manual driving in which both steering and acceleration/deceleration is required is performed, and the driving assistance method further comprises:

when the automated driving control device is operating in the mode C, advancing the operation timing of the second preliminary operation as compared with when the automated driving control device is operating in the mode D or E, and when the automated driving control device is operating in the mode A or B, delaying the operation timing of the second preliminary operation as compared with when the automated driving control device is operating in the mode D or E.

* * * * *